Patented Apr. 28, 1953

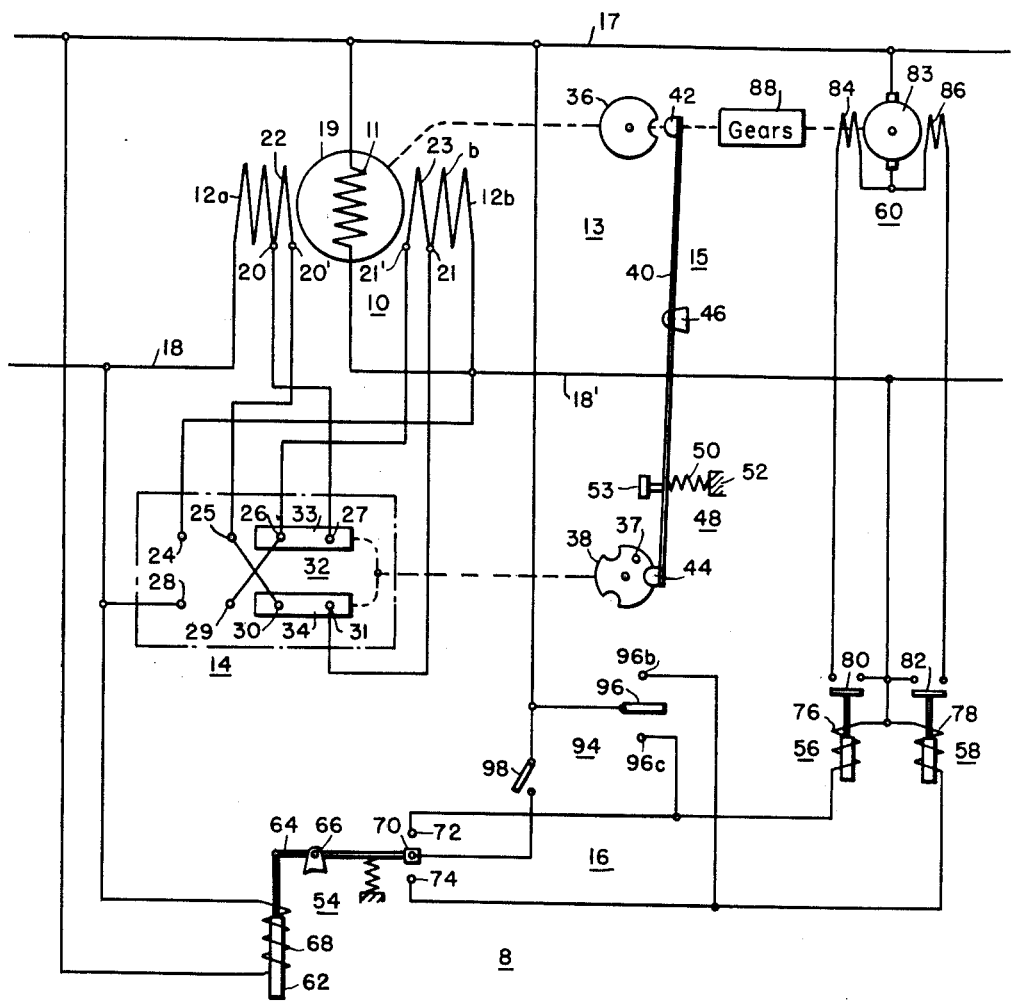

2,637,016

UNITED STATES PATENT OFFICE 2,637,016

SINGLE-PHASE INDUCTION REGULATOR

Lester G. Tubbs, Pittsburgh, Pa., assignor to Westinghouse Electric Corporation, East Pittsburgh, Pa., a corporation of Pennsylvania Application December 20, 1950, Serial No. 201,835

6 Claims. (Cl. 323—43.5)

1

This invention relates to regulators and particularly to single-phase induction regulators used in maintaining a line voltage substantially constant.

When the impedance of a load connected to the secondary winding of an induction regulator decreases, the magnitude of the load current and hence the magnitude of the current in the secondary winding of the regulator increases. Therefore, if only one induction regulator is to be used in conjunction with a load that varies between wide limits, the secondary winding of the induction regulator must so be constructed as to withstand the increased secondary current due to a decrease in the impedance of the load without injury to the winding.

Heretofore, in induction regulators having a two-section secondary winding, the increase in load current was handled by connecting the two sections of the secondary winding in parallel circuit connection. By so connecting the sections of the secondary winding, two current ratings for the secondary winding could be obtained—a low current rating when the two sections were connected in series circuit connection and a higher current rating when the sections were connected in parallel circuit connection. With the sections of the secondary winding connected in series circuit connection, it was possible, for instance, to obtain a current rating of 300 amperes for the secondary winding and a voltage regulation of 10% buck or boost, and with the sections of the secondary winding connected in parallel circuit connection, it was possible to obtain a current rating of 600 amperes for the secondary winding and 5% buck or boost voltage regulation. Oftentimes it is desirable to obtain a current rating for the secondary winding which is intermediate the values that are obtainable when connecting the sections of the secondary winding in series or parallel circuit connection.

Many times, the value of the load current is intermediate the value of the higher and lower current ratings for the secondary winding. On switching to the higher rating or parallel circuit connection, when the load current is at some intermediate value, the per cent voltage regulation is considerably decreased. Frequently, this decreased per cent voltage regulation is not sufficient to maintain the line voltage constant. Therefore, unless such an intermediate current rating for the secondary winding can be obtained with a single induction regulator, another induction regulator capable of withstanding the load current and having a high enough per cent voltage regulation will have to be utilized. It is,

2 therefore, desirable to provide an induction voltage regulator which has more than two current ratings for the secondary winding.

An object of this invention is the provision of an induction voltage regulator having a two-section secondary winding, which sections have taps on them so as to obtain a plurality of current ratings for the secondary winding with a minimum of power loss.

A further object of this invention is to obtain a plurality of current ratings for the secondary winding of an induction voltage regulator with a minimum of power loss in the secondary winding by providing a tapped and sectionalized winding and connecting a portion of each section of the secondary winding in parallel circuit connection with a portion of the other section, the remainder of the secondary winding being in series circuit connection with the said parallel circuit connection.

Other objects of this invention will become apparent from the following description when taken in conjunction with the accompanying drawing, the single figure of which is a diagrammatic representation of apparatus and circuits illustrating an embodiment of this invention.

Referring to the drawing, there is illustrated a regulating system 8 embodying the teachings of this invention. The regulating system 8 comprises a single-phase induction voltage regulator 10 having a rotatable primary winding 11 and a stationary secondary winding consisting of sections 12a and 12b, the regulator 10 being electrically connected to a main electrical circuit 13. Switching means 14 disposed to be manually operated is electrically connected to the secondary winding sections 12a and 12b of the induction regulator 10 for selectively connecting the sections 12a and 12b of the secondary winding in a plurality of circuit connections. In order to prevent the operation of the switching means 14 unless the primary winding 11 of the induction regulator 10 is in its neutral position to thereby prevent flux produced by the alternating current flowing in the primary winding 11 from interlinking the secondary winding sections 12a and 12b, an interlock means 15 is disposed in operative relation with respect to both the induction regulator 10 and the switching means 14. Control means 16 is provided for controlling the rotation of the primary winding 11 in one direction or the other and for varying the electrical coupling between the primary winding 11 and the secondary winding sections 12a and 12b so as to maintain the output voltage of the induction regulator substantially constant.

The main electrical circuit 13 comprises line conductors 17 and 18—18' and is connected to a source (not shown) of single-phase energy. The induction regulator 10 is connected in circuit with line conductors 17 and 18—18' in order to compensate for the variations in voltage occurring on the main circuit 13.

The induction regulator 10 as hereinbefore mentioned comprises the primary winding 11 disposed on a rotor 19, the primary winding 11 being connected across the conductors 17 and 18'. The secondary winding sections 12a and 12b are disposed to be connected in series circuit relation with the conductors 18 and 18'. The secondary winding sections 12a and 12b are provided with taps 20 and 20' and 21 and 21', respectively, associated with portions 22 and 23, respectively, and disposed for connection to the switching means 14 to control the predetermined connection of the portions 22 and 23, respectively, in the secondary winding circuit.

The switching means 14 is provided in order that a plurality of current ratings may be obtained for the secondary winding of the regulator 10. This is effected by either connecting the sections 12a and 12b of the secondary winding in series circuit relation, parallel circuit relation, or by connecting the portions 22 and 23 in parallel circuit relation with the remaining portions of the sections 12a and 12b being connected in series with this latter parallel circuit connection. The switching means 14 illustrated comprises a plurality of spaced terminals 24, 25, 26, 27, 28, 29, 30 and 31 and a terminal bridging member 32. The terminals 24 and 25 are electrically connected to one end of the section 12b and to the tap 20' of section 12a, respectively, the terminals 28 and 29 being connected to one end of the section 12a and the tap 21' of section 12b, respectively. On the other hand, the terminals 26 and 27 are electrically connected to the tap 21' and the tap 20, respectively and the terminals 30 and 31 are connected to the tap 20' and the tap 21, respectively.

The bridging member 32 is provided to facilitate in the making of the hereinbefore-mentioned circuit connections of the sections 12a and 12b of the secondary winding. The bridging member 32 can be actuated into any one of three positions. In the position shown in the drawing in which the terminals 26 and 27 are electrically connected to one another and the terminals 30 and 31 are likewise electrically connected to one another by means of the bridging member 32, the portions 22 and 23 of the secondary winding sections 12a and 12b are connected in parallel circuit relation with one another. The remaining portions of the secondary winding sections are connected in series circuit relation with this latter parallel circuit connection. The sections 12a and 12b of the secondary winding may be connected in series circuit relation by actuating the bridging member 32 to the left so as to electrically connect the terminals 25 and 26 to one another and electrically connect the terminals 29 and 30 to one another. The parallel circuit connection of the sections 12a and 12b of the secondary winding may be obtained by actuating the bridging member 32 further to the left so as to electrically connect the terminals 24 and 25 to one another and electrically connect the terminals 28 and 29 to one another.

As hereinbefore mentioned, when the conducting bars 33 and 34 are positioned as shown in the drawing so as to bridge only the terminals 26—27 and 30—31, respectively, the portions 22 and 23 of the secondary winding sections 12a and 12b are connected in parallel circuit relation with one another, the remaining portions of the secondary windings sections 12a and 12b being connected in series circuit relation with this latter parallel circuit connection. The parallel portion of this circuit extends from the tap 21 of section 12b to tap 20 of section 12a. Thus one side of the parallel circuit extends from tap 21, through terminal 31, conducting bar 34, terminal 30, terminal 25, tap 20', and the portion 22 of secondary winding section 12a to tap 20 and the other side of the parallel circuit extends from tap 21 of section 12b through portion 23 of the secondary winding section 12b, tap 21', terminal 26, conducting bar 33, and terminal 27 to the tap 20. The series circuit thus extends from the line conductor 18', through a portion of the secondary winding section 12b to the terminal 21, the parallel connected sections 22 and 23, tap 20, the remaining portion of winding section 12a and line conductor 18.

The bridging member 32 comprises conducting bars 33 and 34, associated with terminals 24—25—26—27 and 28—29—30—31, respectively, these bars being of sufficient length to bridge three of the associated adjacent terminals of the switching means 14 during a switching operation. For instance, when the conducting bar 33 is actuated to the left from its position as shown in the drawing, it remains in contact engagement with the terminal 27 until after it makes electrical contact with the terminal 25. Likewise the conducting bar 34 remains in contact engagement with the terminal 31 until after it makes electrical contact with the terminal 29. When the conducting bars 33 and 34 bridge terminals 25—26—27 and 29—30—31, respectively, they establish low resistance shunting circuits about the portions 22 and 23, respectively. The shunting circuit thus established extends from conductor 18 through a portion of winding section 12a to the tap 20 and from thence through terminal 27 of the switching device 14, conducting bar 33, terminal 26, terminal 29, conducting bar 34, terminal 31, tap 21 and a part of the winding section 12b to the conductor 18'.

When the bridging member 32 is being actuated from one position to another position, the terminals 25, 26 and 27 and the terminals 29, 30 and 31 are only momentarily bridged by the conducting bars 33 and 34, respectively, so as to prevent an interruption of the secondary winding circuit during a switching operation and thereby prevent an interruption of the power supply to the load and undue wear on the contact members of the switching means 14.

When the conducting bars 33 and 34 are further actuated to complete the switching operation and bridge only terminals 25—26 and 29—30, respectively, the complete winding sections 12a and 12b are connected in series circuit relation. This circuit extends from the conductor 18 through winding section 12a, tap 20', terminal 25, conducting bar 33, terminal 21', and winding section 12b to the conductor 18'.

As the bridging member 32 is further actuated to effect another switching operation, the conducting bars 33 and 34 bridge terminals 24—25—26 and 28—29—30, respectively, to establish low resistance shunting circuits about the secondary winding sections 12a and 12b. The shunting circuit thus established extends from the conductor 18 through terminal 28 of the switching device 14, conducting bar 34, terminals 29 and 26, conducting bar 33 and terminal 24 to the conductor 18'. Again, it is only when the conducting bars 33 and 34 are being actuated during a switching operation from one position to another so as to obtain a different circuit connection of the sections 12a and 12b that they momentarily bridge the terminals 24, 25 and 26 and the terminals 28, 29 and 30, respectively, to prevent an open circuit condition.

As the switching operation is continued so that the conducting bars 33 and 34 bridge only terminals 24—25 and 28—29, respectively, the winding sections 12a and 12b are connected in parallel circuit relation. This circuit extends from the conductor 18 through winding section 12a, tap 20', terminal 25, conducting bar 33 and terminal 24 to conductor 18' and from the conductor 18 through terminal 28, conducting bar 34, terminals 29 and 26, tap 21' and winding section 12b to the conductor 18'.

During the foregoing described switching operations it is necessary to return the primary winding 11 to its neutral position for each switching operation to prevent an excessive flow of current in the shunted portions of the secondary winding sections 12a and 12b. The interlock means 15 is thus provided to prevent movement of the bridging member 32 unless the primary winding 11 is in its neutral position as shown in the drawing. The interlock means 15 comprises two interlock discs 36 and 38 and a cooperating rod member 40. The rod member 40 is provided with notch-engaging members 42 and 44 adjacent the ends thereof disposed for selective engagement with a notch in the interlock disc 36 or one of three spaced notches in the interlock disc 38 as the rod 40 is selectively pivoted about a fulcrum 46. The interlock disc 36 is mechanically connected to the rotor 19 and is positioned as shown in the drawing, with the notch of the interlock disc 36 disposed to receive the notch-engaging member 42 when the primary winding 11 is in its neutral position. When the primary winding 11 is rotated through a certain number of degrees of rotation, the interlock disc 36 is likewise rotated through a corresponding number of degrees of rotation. The interlock disc 38 is mechanically connected to the bridging member 32 and in the embodiment illustrated is provided with a handle 37 disposed for manual operation to effect a simultaneous movement of the interlock disc 38 and a switching operation of the bridging means 32. Thus, the bridging member 32 can be actuated only when the notch-engaging member 44 is out of engagement with the notches in the interlock disc 38. In order that the notch-engaging member 44 may be normally biased to engage one of the notches formed in the interlock disc 38, a spring biasing means 48 is disposed between the fulcrum 46 and the notch-engaging means 44 to apply a force to the rod 40. The spring biasing means 48 in this instance comprises a compression spring 50 disposed between the rod member 40 and a stationary wall member 52 to normally bias the rod 40 in a clockwise direction about its fulcrum 46.

In order to disengage the notch-engaging member 44 from one of the notches in the disc 38, it is necessary to rotate the primary winding 11 to the neutral position as shown in the drawing, and in which the disc 36 is positioned with its notch disposed to receive the notch-engaging member 42. With the disc 36 so positioned, the rod 40 may be pivoted by manually applying force to a button 53 in opposition to the biasing force of the spring 50 to thereby cause the notch-engaging member 44 to be actuated out of engagement with one of the notches of the disc 38 and the notch-engaging member 42 into engagement with the notch in the disc 36. It is only when the disc 36 is positioned as shown in the drawing that the rod member 40 may be pivoted in the counter-clockwise direction about the fulcrum 46 to disengage the notch-engaging member 44 from a notch in the disc 38 so that the disc 38 can be actuated to move the bridging member 32 through a switching operation. With the disc 36 in any position but that position corresponding to the neutral position of the primary winding 11, it is impossible to pivot the rod member 40 since the notch-engaging member 42 will be prevented by the circumferential surface of the disc 36 from engaging the notch of the disc 36. Therefore, it is impossible for the operator to actuate the bridging member 32 unless he has first returned the primary winding 11 to its neutral position, which latter operation will hereinafter be described.

As hereinbefore stated, the control means 16 is provided for rotating the rotor 19 in one direction or the other and for varying the electrical coupling between the primary winding 11 and the secondary winding sections 12a and 12b so as to maintain the voltage output of the induction regulator 10 and consequently the voltage across conductors 17 and 18 substantially constant. The control means 16 comprises relays 54, 56 and 58 and a motor 60. The relay 54 is a beam-type relay and has a movable armature member 62 which is mechanically connected to a beam member 64 which is pivoted about a fulcrum 66. The movable armature member 62 has an operating winding 68 disposed to be energized in response to the output of the induction regulator 10 so that the operation of the relay 54 will be dependent on the output voltage from the induction regulator 10. The relay 54 is also provided with three contact members, a movable contact member 70 connected to one extremity of the beam member 64 and two stationary opposed contact members 72 and 74 disposed to be selectively engaged by the movable contact member 70.

The relays 56 and 58 comprise operating coils 76 and 78 and contact members 80 and 82, respectively. One end of the operating coil 76 is electrically connected to the stationary contact member 72, and one end of the operating coil 78 is electrically connected to the stationary contact member 74. The other ends of the operating coils 76 and 78 are electrically connected to the line conductor 18'. As illustrated the movable contact member 70 is electrically connected through a switch 98 to the other line conductor 17 so that either the contact member 80 or 82 can be selectively actuated to the circuit closing position depending on whether the movable contact member 70 is actuated into engagement with the stationary contact member 72 or 74, respectively.

The motor 60 is provided with an armature 83 and a field winding which is divided into two sections 84 and 86 which are disposed to be electrically connected across conductors 17 and 18' by the contact members 80 and 82, respectively, when the relays 56 and 58, respectively, are energized in order that the motor 60 may be selectively rotated in either one direction or the other.

The armature 83 of the motor 60 is mechanically connected to the rotor 19 through a suitable gearing represented by the block 88, so as to provide a lower speed of rotation for the rotor 19 than the speed of rotation of the armature of the motor 60.

In order that the primary winding 11 may be returned to its neutral position before a different circuit connection of the secondary winding sections 12a and 12b is obtained, switching means 94 is provided and disposed for manual operation to selectively control the energization of the relays 56 and 58 to selectively effect the directional rotation of the rotor 19 to the neutral position. The switching means 94 in this instance comprises switches 96 and 98. As illustrated, the switch 96 is a single pole double throw switch having a neutral position disposed to be selectively actuated to engage cooperating stationary contact members 96b and 96c. The switch 96 is electrically connected to line conductor 17, and the stationary contact members 96b and 96c are electrically connected to the operating coils 78 and 76, respectively, so that the operating coil 78 or the coil 76 may be selectively energized thus effecting a rotation of the motor 60 in a predetermined direction to return the primary winding 11 to its neutral position. The switch 98 is a single pole single throw switch which is connected in the circuit from the movable contact member 70 to the line conductor 17. When the switch 98 is in the circuit interrupting position, it nullifies the regulating effect of the relay 54. In practice, the switch 98 is actuated to the circuit interrupting position before the switch 96 is actuated to a circuit closing position to control the rotation of the motor 60.

In operation, the alternating current flowing in the primary winding 11 produces a magnetic flux, the amount and direction of this flux which is linked with the secondary winding sections 12a and 12b being dependent upon the angular position of the primary winding 11. An induced voltage in either direction and of any magnitude within the range of the regulator 10 may be added to or subtracted from the voltage of the circuit constituting the conductors 17 and 18' by properly adjusting the position of the primary winding 11. In the drawing, the primary winding 11 is shown at right angles to the secondary winding sections 12a and 12b so that the flux produced by the alternating current in the primary winding 11 does not induce any voltage in the sections 12a and 12b, and the voltage across the conductors 17 and 18 is unaffected by the induction regulator 10.

If the primary winding 11 is rotated from its neutral position, more and more of the primary flux is linked with the secondary winding sections 12a and 12b until the winding 11 is parallel with the sections 12a and 12b when substantially all the primary flux is linked with the secondary winding sections 12a and 12b, and a maximum voltage in one direction is induced in the sections 12a and 12b. If the primary winding 11 is rotated in the opposite direction from its neutral position, the voltage induced in the sections 12a and 12b will be similarly increased from zero to its maximum value but in the opposite direction.

The control means 16 controls the direction of rotation of the rotor 19 carrying the primary winding 11 as well as the electrical coupling between the primary winding 11 and the secondary winding sections 12a and 12b. When the switch 98 is in the closed position and the switch 96 in a circuit interrupting position, the relay 54 is energized in response to the voltage across the conductors 17 and 18 to selectively control the energization of relays 56 and 58 and thereby control the directional rotation of the motor 60 and the positioning of the rotor 19 with respect to the secondary winding sections 12a and 12b so as to maintain the output voltage from the induction regulator 10 substantially constant.

For instance, if the output voltage from the induction regulator 10 rises above the regulated value, the voltage across the operating coil 68 of the relay 54 increases. The increased voltage across the operating coil 68 increases the magnetic pull on the movable armature 62 effecting a pivoting of the member 64 about the fulcrum 66, so as to bring the movable contact member 70 into engagement with the stationary contact member 74. When the contact members 70 and 74 are in engagement, the energizing circuit for the operating coil 78 of the relay 58 is established. When the operating coil 78 is thus energized, the contact member 82 is actuated to a circuit closing position to thus complete an energizing circuit for the field winding 86 and thereby effect a rotation of the armature of the motor 60 and of the rotor 19 in a direction and through the proper number of degrees of rotation to lower the output voltage of the induction regulator 10 to the regulated value.

However, if the output voltage of the induction regulator 10 falls below the regulated value, the voltage across the operating coil 68 decreases, and the contact member 70 engages the stationary contact member 72. With the contact members 70 and 72 in engagement the energizing circuit is completed to the operating coil 76 of the relay 56, to actuate the contact member 80 to a circuit closing position to effect the energization of the field winding 84. The energization of the field winding 84 will cause the motor 60 and the rotor 19 to rotate in a direction and through the proper number of degrees of rotation to raise the output voltage of the induction regulator 10 to its regulated value.

If the load should vary considerably, necessitating a different circuit connection of the secondary winding sections 12a and 12b, the switch 98 is moved to an open circuit position and the switch 96 is selectively actuated into engagement with the stationary contact member 96b or 96c, depending upon the direction it is necessary to rotate the primary winding 11 to return it to its neutral position, as described hereinbefore. After the primary winding 11 and its rotor 19 are returned to the neutral position as shown in the drawing, the rod member 40 may be pivoted in a counter-clockwise direction about its pivot to move the notch-engaging member 44 out of engagement with a notch of disc 38 and the notch-engaging member 42 into engagement with the notch of disc 36, so as to permit rotation of the interlock disc 38. The disc 38 is then manually rotated to effect a switching movement of the bridging member 32.

As illustrated in the drawing, the bridging conducting bars 33 and 34 are so positioned as to electrically connect the terminals 26 and 27 together and electrically connect the terminals 30 and 31 together. With the bridging member 32 in this position, the portions 22 and 23 of the secondary winding are connected in parallel circuit relation with each other and the remaining portions of the sections 12a and 12b are in series circuit relation therewith. The magnitude of the load will determine whether it is necessary to actuate the bridging member 32 further to the left so as to obtain either a series or a parallel circuit connection of the sections 12a and 12b. If the load current rises to a magnitude above the current rating of the secondary winding sections 12a and 12b when the conducting bar 33 is bridging the terminals 26—27, the bridging member 32 should be actuated to the left so that the conducting bar 33 bridges the terminals 24—25, thus connecting the secondary winding sections 12a and 12b in parallel circuit relation. If, however, the change in the load current is a decrease instead of an increase the bridging member 32 may be actuated to the left so that the conducting bar 33 bridges the terminals 25—26 thus connecting the sections 12a and 12b in series circuit relation. Such an operation is desirable when it is necessary to obtain an increase in the percent voltage regulation.

Having determined the correct position of the bridging member 32 for the particular load, the switch 96 is positioned in its neutral position and the switch 98 is actuated to the circuit closing position, thus establishing the regulating system 8 with automatic operation to maintain the output voltage of the induction regulator 10 substantially constant. The regulating system 8 is maintained in the automatic operating position until the magnitude of the load current varies sufficiently to again necessitate the changing of the tap connections of the secondary winding sections 12a and 12b.

The single-phase induction voltage regulator 10 embodying the teachings of this invention can handle a load current that fluctuates over a wide range and at the same time a larger percent voltage regulation can be obtained for each value of load current. This large percent voltage regulation can be obtained with a minimum of loss in the secondary winding sections 12a and 12b.

I claim as my invention:

1. In an induction regulator, the combination comprising, a primary winding, a secondary winding consisting of a plurality of sections, each section having a number of taps and being inductively associated with the primary winding, means for varying the electrical coupling between the primary winding and the sections of the secondary winding, and switching means connected to the taps on the secondary winding for connecting a portion of one of the sections of the secondary winding in parallel circuit relationship with a portion of another section of the secondary winding to thereby establish a secondary winding circuit that comprises the two parallel connected portions of the secondary winding sections connected in series circuit relationship with the remaining portions of the secondary winding sections.

2. In an induction regulator, the combination comprising, a stationary secondary winding consisting of two sections, each section having a plurality of taps, a movable primary winding inductively associated with the secondary winding, means for moving the primary winding with respect to the secondary winding so as to vary the electrical coupling therebetween, and switching means connected to the taps on the secondary winding for connecting a portion of one of the sections of the secondary winding in parallel circuit relationship with a portion of the other section of the secondary winding to thereby establish a secondary winding circuit that comprises the two parallel connected portions of the secondary winding sections connected in series circuit relationship with the remaining portions of the secondary winding sections.

3. In an induction regulator, the combination comprising, a primary winding having a support therefor, a secondary winding consisting of two sections, each section having a plurality of taps and being inductively associated with the primary winding, means for varying the electrical coupling between the primary winding and the secondary winding, switching means connected to the taps on the secondary winding for connecting a portion of one of the sections of the secondary winding in parallel circuit relationship with a portion of the other section of the secondary winding to thereby establish a secondary winding circuit that comprises the two parallel connected portions of the secondary winding sections connected in series circuit relationship with the remaining portions of the secondary winding sections, and interlock means connected to the switching means and to the support for the primary winding disposed to prevent operation of the switching means while there is electrical coupling between the primary winding and the secondary winding.

4. In an induction regulator, the combination comprising, a stationary secondary winding consisting of two sections, each section having a plurality of taps, a movable primary winding having a support and being inductively associated with the secondary winding, means for moving the primary winding with respect to the secondary winding so as to vary the electrical coupling therebetween, switching means for connecting a portion of one of the sections of the secondary winding in parallel circuit relationship with a portion of the other section of the secondary winding to thereby establish a secondary winding circuit that comprises the two parallel connected portions of the secondary winding sections connected in series circuit relationship with the remaining portions of the secondary winding sections, said switching means comprising two sets of taps, one set being connected to one of the said portions of the secondary winding and the other set being connected to the other portion, conducting means disposed to be actuated to interconnect each of the two sets of taps, and interlock means connected to the conducting means and to the support for the primary winding disposed to prevent the operation of the conducting means while there is electrical coupling between the primary winding and the secondary winding.

5. In an induction regulator, the combination comprising, a stationary secondary winding consisting of two sections, each section having a plurality of taps, a movable primary winding inductively associated with the secondary winding, means for moving the primary winding with respect to the secondary winding so as to vary the electrical coupling therebetween, and switching means disposed to interconnect the taps on the secondary winding and selectively connect the two sections of the secondary winding in either series circuit relationship, parallel circuit relationship, and so that a portion of one of the sections of the secondary winding is connected in parallel circuit relationship with a portion of the other section of the secondary winding, to thereby establish a secondary winding circuit that comprises the two parallel connected portions of the secondary winding sections connected in series circuit relationship with the remaining portions of the secondary winding sections.

6. In an induction regulator, the combination comprising, a stationary secondary winding consisting of two sections, each section having a plurality of taps, a movable primary winding having a support and being inductively associated with the secondary winding, means for moving the primary winding with respect to the secondary winding so as to vary the electrical coupling therebetween, switching means disposed to interconnect the taps on the secondary winding and selectively connect the two sections of the secondary winding in either series circuit relationship, parallel circuit relationship, and so that a portion of one of the sections of the secondary winding is connected in parallel circuit relationship with a portion of the other section of the secondary winding to thereby establish a secondary winding circuit that comprises the two parallel connected portions of the secondary winding sections connected in series circuit relationship with the remaining portions of the secondary winding sections, and interlock means connected to the switching means and to the support for the primary winding disposed to prevent operation of the switching means while there is electrical coupling between the primary winding and the secondary winding.

LESTER G. TUBBS.

References Cited in the file of this patent

UNITED STATES PATENTS

| Number | Name | Date |
|---|---|---|
| 1,053,110 | Ritchter | Feb. 11, 1913 |
| 2,157,814 | Bolte | May 9, 1939 |
| 2,355,998 | Palme | Aug. 15, 1944 |